United States Patent

[11] 3,579,033

[72] Inventor Larry B. Phillips
Santa Clara, Calif.
[21] Appl. No. 818,265
[22] Filed Apr. 22, 1969
[45] Patented May 18, 1971
[73] Assignee Granger Associates
Palo Alto, Calif.

[54] ELECTROSTATIC DISCHARGER WITH INTERNAL RESISTANCE ELEMENT
6 Claims, 7 Drawing Figs.

[52] U.S. Cl. ............................................ 317/2
[51] Int. Cl. ............................................ H05f 1/00, H05f 3/00

[50] Field of Search ............................................ 317/2, 2.4

[56] References Cited
UNITED STATES PATENTS
3,034,020  5/1962  Benkoczy et al. ............ 317/2
3,170,087  2/1965  Tanner et al. ................. 317/2

Primary Examiner—Lee T. Hix
Attorney—Flehr, Hohbach, Test, Albritton and Herbert

ABSTRACT: A discharger for reducing electrostatic discharge interference on objects such as aircraft having an elongated insulating body with an internal resistive element connecting the object to a conductive discharge element at the end of the body via the resistive element.

Patented May 18, 1971
3,579,033
2 Sheets-Sheet 1
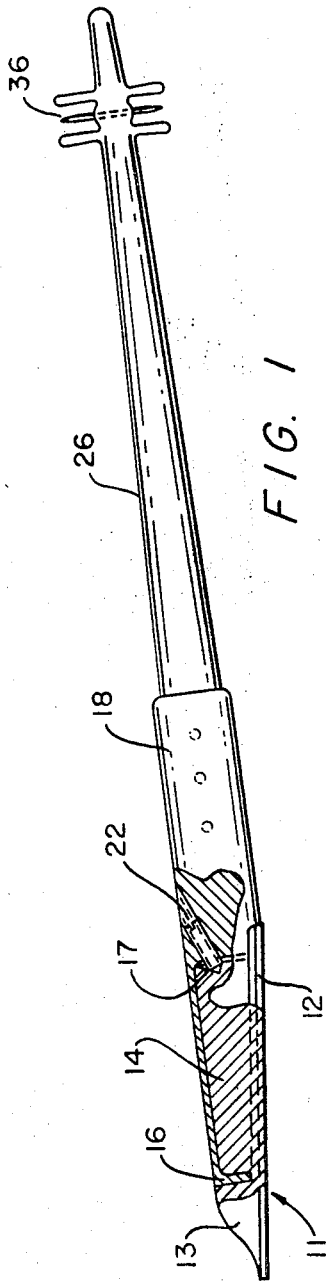
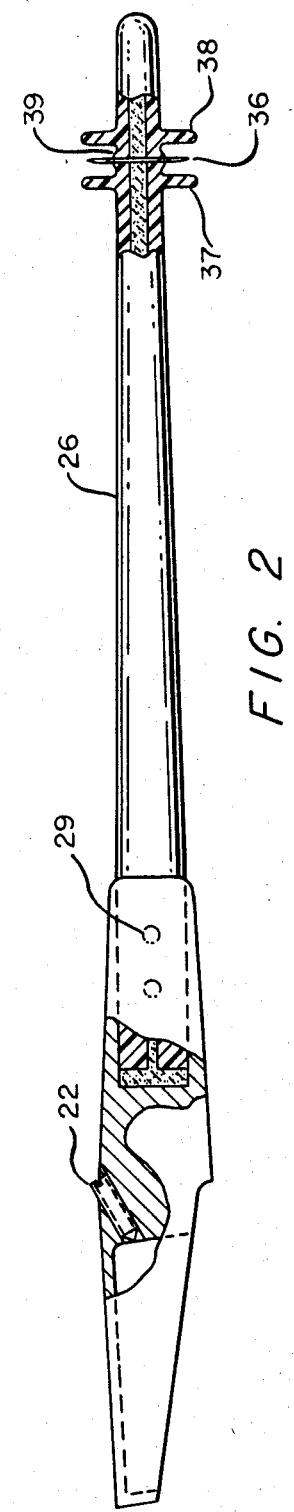
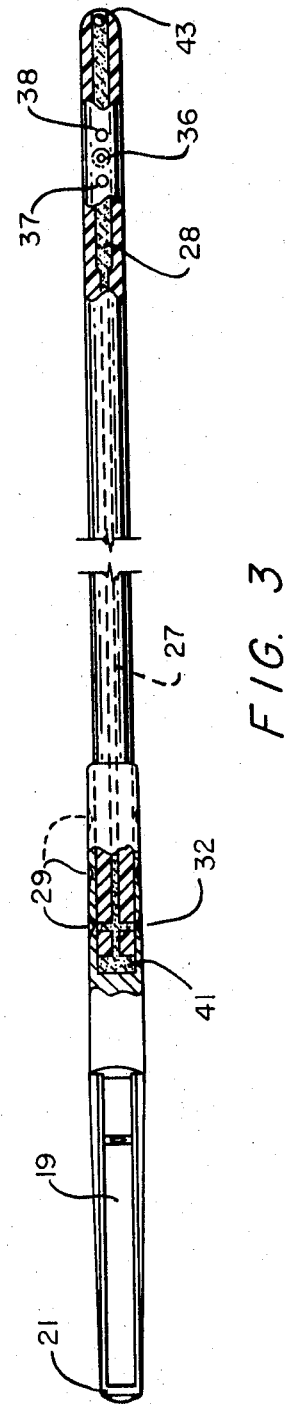
INVENTOR.
LARRY B. PHILLIPS
BY
ATTORNEYS

INVENTOR.
LARRY B. PHILLIPS

BY *Fisher, Hubbard, Test Albritton & Herbert*

ATTORNEYS

ELECTROSTATIC DISCHARGER WITH INTERNAL RESISTANCE ELEMENT

BACKGROUND OF THE INVENTION

The present invention relates generally to static discharges of the type suitable for use on aircraft to eliminate or substantially reduce static interference in the antenna system of the aircraft.

Prior art static discharges have taken various forms such as wick dischargers and null field dischargers. Generally dischargers include a retainer base adapted to be secured to an object to be discharged, such as an aircraft, and to receive and support a static discharger body extending outwardly therefrom. One type of discharger includes an elongated electrically nonconductive discharge member or body coated with a distributed high resistance electrically conductive coating. The coating is electrically connected at one end with the base (aircraft) and at the other end with conductive means such as a discharge tip to electrically couple the tip to the aircraft through the high resistance element to provide a corona discharge point at the tip.

Use is made of the distributed resistive coating in that for static and direct currents it acts as a conductor, whereas to the radio frequency field, it acts as an insulator. Thus, the conducting means or point suspended at the end of the distributed resistance appears isolated from the aircraft for the radio frequency field while it acts as a projection from the wing from which static discharge takes place for the static field. One particular type of static discharger includes a transverse discharge pin having sharp points extending from the discharger at a point spaced from the retainer base. This form of discharger has been successfully employed in eliminating the static problem in aircraft. This type of discharger operates on the principle that the region of highest DC field near the charged aircraft, which is the point at which corona discharge will occur from the moving aircraft, is made to correspond to a region in which the radio frequency antenna field is near zero or at the region in which the two sets of field lines are at right angles, or preferably, both. Static dischargers of this type are described in U.S. Pat. Nos. 2,933,732 and 3,106,663.

Owing to the physical location of such static dischargers, they are subjected to severe environmental conditions such as snow, rain, wind buffetting, icing, vibrations and the like. The severe environment to which the dischargers are exposed, and especially the exposure of the electrical conductive coating, causes deterioration of the dischargers and, therefore, necessitates periodic replacement.

SUMMARY OF THE INVENTION AND OBJECTS

There is provided a static discharger of the type adapted to be mounted to an object to be discharged, such as an aircraft, including an elongated electrically nonconductive member or body with an electrically conductive high resistance core formed in the body and adapted to resistively connect the object to be discharged to an electrically conductive corona discharge member spaced from the object.

It is a general object of the present invention to provide an improved static discharger.

It is another object of the present invention to provide an improved static discharger.

It is another object of the present invention to provide a static discharger in which the high resistance connecting the corona discharge member to the object being discharged is protected from environmental condition.

It is another object of the present invention to provide a static discharger having an internal resistance connecting the object to be discharged to a conductive discharge member.

It is another object of the present invention to provide a static discharger having an internal resistance element located in a region of low mechanical stress.

The foregoing and other objects of the invention will become more clearly apparent from the following description taken in connection with the accompanying drawings.

BRIEF DESCRIPTION OF THE DRAWINGS

FIG. 1 is a side elevational view of a static discharge member secured to a mounting base.

FIG. 2 is an enlarged side elevational view of the static discharge member shown in FIG. 1.

FIG. 3 is a bottom view of the discharge member shown in FIG. 2 partly in section to show the internal resistance.

DESCRIPTION OF THE PREFERRED EMBODIMENT

Figure 4:
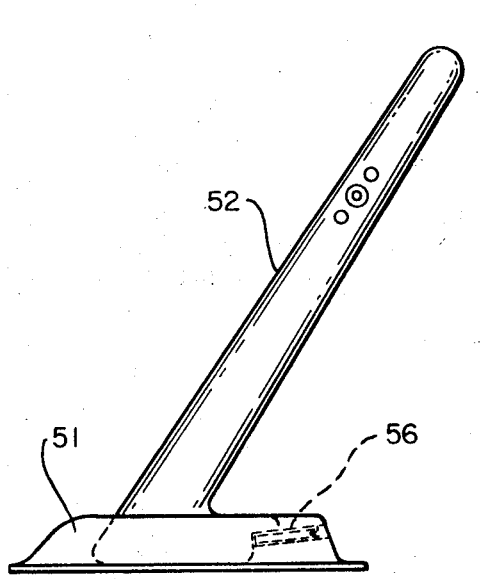
FIG. 4 is a side elevational view of another static discharge member incorporating the present invention.

One form of static discharger is shown in FIG. 1, 2 and 3. The discharger comprises a retainer base 11 of strong, lightweight metal, such as aluminum. The base includes a wide, relatively flat portion 12 and a narrow riser portion 13. The wide, flat portion serves as a mounting surface by which the discharger may be secured, as by electrically conductive adhesive to the object to be discharged such as an aircraft wing surface. The base includes a boss 14 which extends upwardly from the base to define a slot 16. The boss includes an inclined surface 17. An aluminum retainer cover 18 having a recess 19, FIG. 3, is adapted to fit over the boss 14 with the end 21 within the slot 16. A set screw 22, FIGS. 1 and 2, is threadably received by the cover and engages the inclined surface 17 and serves to removably secure the cover to the base.

The end of the retainer cover 18 includes a well adapted to receive an elongated, strong, lightweight, electrically nonconductive plastic precipitation static rodlike discharge member 26 which may be formed of material such as Nylon. The rodlike discharge member 26 is formed with an elongated passage or hole 27 of relatively uniform diameter which increases in diameter at the distal end 28. The rodlike discharge member 26 is received within the retainer cover and may be staked in the retainer cover by staking the cover as indicated at 29 to depress the cover and force it into the member. The discharge member 26 includes a plurality of radial or transverse openings 32 which communicate with the central hole 27.

A corona discharge pin 36 made of conductive metal such as tungsten with sharply pointed ends is embedded in the distal end of the discharge member and crosses the enlarged hole or bore 28. The discharge member may include two pairs of outwardly extending protrusions or rods 37, 38 with each pair having one rod on each side of the pin 36. Preferably, these rods are slightly longer than the discharge pins and are positioned in close proximity to protect the pin. The discharge member may include dome-shaped protrusions 39 which increase the support for the transverse discharge pin 36.

After the discharge member is mounted in the holder or cover 18 and the discharge pin 36 has been inserted, resistive material is injected into the hole from the distal end. The material fills the enlarged hole 28, the hole 27 and downwardly to fill the space 41 between the discharge member and the cover and to flow outwardly through the openings 32 to migrate into the space between the discharge member and the cover to form effective electrical connection between the internal resistive material and the cover. Likewise, the material in the enlarged bore 28 adheres to the pin and forms a good electrical connection to the pin. Thus, the resistive material provides a resistive connection between the base and the discharge tip.

The material may comprise, for example, a matrix such as a thermal setting epoxy which has dispersed therein electrical carbon and graphite to provide suitable electrical resistance. Preferably, the resistance between the cover and the discharge pin is in the range of between 1 and 1,000 megohms.

While the resistive material is soft, a Nylon ball 43 is positioned in the end of the discharge member and is secured thereto by swaging over the edges to retain the ball and provide a rounded surface from which discharge will not effectively take place.

The enlarged hole portion 28 makes the location of the pin along the discharge member less critical since the major portion of the distributed resistance is in the elongated portion of small diameter.

It is, therefore, observed that the resistive element providing the electrical connection between the object to be discharged and the discharge points is fully protected from environmental conditions. Furthermore, it is located along the axis of the discharge member which is the point of minimum mechanical stresses which might occur as a result of vibration and flexure of the discharge member.

Figure 7:
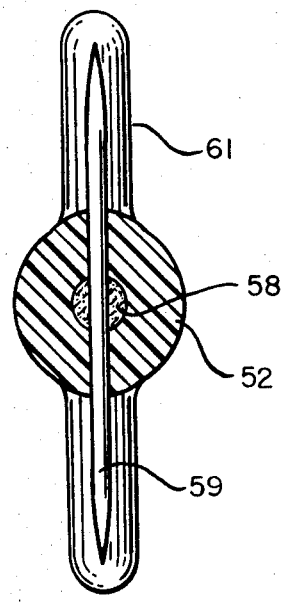
FIG. 7 is a sectional view taken along the line 7—7 of FIG. 5.
Figure 5:
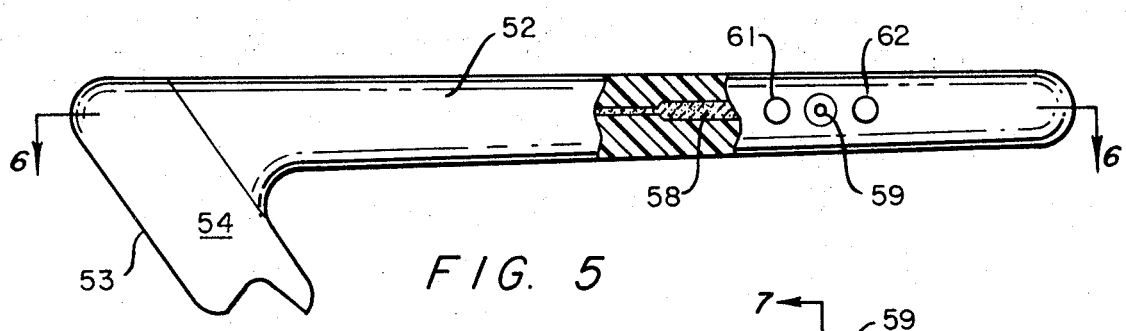
FIG. 5 is an enlarged view of the static discharge member shown in FIG. 4.
Figure 6:
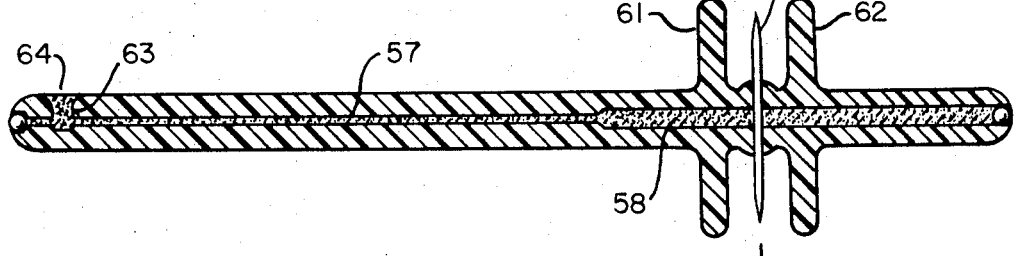
FIG. 6 is a sectional view taken along the line 6—6 of FIG. 5.

Referring to FIGS. 4—7, there is shown another form of discharger. The discharger includes a base 51 and a rodlike discharge member 52 extending outwardly therefrom. The discharge member 52 is made of a high resistance material such as Nylon including a mounting portion 53 adapted to fit within a recess (not shown) in the base 51. The mounting portion 53 includes a conductive coating 54 for electrically contacting the base. The discharge member is secured to the base by means of a set screw 56 extending through the base and against the portion 53. The discharge member includes a hole 57 extending axially therethrough and having an enlarged portion 58. The distal end of the discharge member receives discharge pin 59 which extends through the enlarged portion 58 which is adapted to be electrically connected to the internal resistive material. The discharge member may include pairs of protrusions 61 and 62 on opposite sides of the pin 59 which serve to protect the pin against accidental damage. An opening 63 with an enlarged funnel-shaped outer portion 64 communicates between the hole 57 and the conductive coating 54. The ends of the hole 57 are enlarged and adapted to receive plugs. such as Nylon balls, which may be suitably affixed in the end of the discharge member as by heating and rolling over the ends of the discharge member. A conductive material is injected from the distal end of the discharge tip and serves to fill the hole providing a high resistance connection between the pin 59 and the conductive coating 54.

The resistive material may be of the type previously described and include a thermal or self-setting epoxy with embedded graphite and electrical carbon particles. Preferably, it provides a resistance of between 1 and 1000 megohms between the conductive coating 54 and the pin 59.

It is, of course, apparent that the discharge pin may take other forms and may be any conductive member capable of discharging from the distal end of the discharge member.

Thus, there has been provided a discharge member in which the resistive element providing the static and direct current contact between the object to be discharged and the conductive discharge member is in the form of an internal resistance protected from the environmental elements and located in a region of low mechanical stress.

I claim:

1. A static discharger comprising an elongated rodlike member of nonconductive material adapted to be mounted at one end to a body to be discharged, rod-like member having an axial longitudinal hole, conductive discharge means extending through the distal end of said rodlike member and through said hole, and high resistance means disposed within and filling said hole throughout the length thereof, and contacting said discharge member to provide a high resistance electrical path between said body to be discharged and said discharge means.

2. A static discharge member as in claim 1 wherein said hole includes an enlarged portion at the distal end where the resistance material is in contact with said discharge means.

3. A static discharger as in claim 2 wherein said conductive discharge means comprises a transverse pin extending through the enlarged portion of the hole to contact the resistive material.

4. A static discharger comprising a retainer base adapted to be secured to an object to be discharged, an elongated electrically nonconductive discharge member adapted to be mounted to said base, said member having an axial longitudinal hole, a metallic, electrically conductive corona discharge pin extending through said discharge body and said hole with at least one sharp pointed end extending therefrom at a position spaced from the retainer base, and a resistive means disposed within and filling said hole throughout the length thereof and serving to electrically connect said pin to said base to provide a discharge path for said static discharger.

5. A static discharge member as in claim 4 wherein said hole includes an enlarged portion at the distal end.

6. A discharge member as in claim 4 wherein said discharge member includes at least one transverse opening filled with said resistive material to provide electrical connection to said base.